US007891337B2

(12) United States Patent
Takeuchi et al.

(10) Patent No.: US 7,891,337 B2
(45) Date of Patent: Feb. 22, 2011

(54) FUEL INJECTION SYSTEM WITH INJECTION CHARACTERISTIC LEARNING FUNCTION

(75) Inventors: Katsuhiko Takeuchi, Chiryu (JP); Kouji Ishizuka, Aichi-ken (JP); Manabu Tsujimura, Anjo (JP)

(73) Assignee: Denso Corporation, Kariya (JP)

( * ) Notice: Subject to any disclaimer, the term of this patent is extended or adjusted under 35 U.S.C. 154(b) by 118 days.

(21) Appl. No.: 12/201,488

(22) Filed: Aug. 29, 2008

(65) Prior Publication Data

US 2009/0063018 A1 Mar. 5, 2009

(30) Foreign Application Priority Data

Aug. 31, 2007 (JP) ............................ 2007-226460

(51) Int. Cl.
*F02M 7/00* (2006.01)
*F02M 51/00* (2006.01)
*B60T 7/12* (2006.01)

(52) U.S. Cl. ...................... 123/436; 123/478; 701/103; 701/104

(58) Field of Classification Search ................ 123/436, 123/674, 698, 478, 480; 701/103, 104, 106, 701/111, 115
See application file for complete search history.

(56) References Cited

U.S. PATENT DOCUMENTS 5,126,943 A * 6/1992 Nakaniwa .................. 701/106
5,131,372 A * 7/1992 Nakaniwa .................. 123/673
5,243,951 A * 9/1993 Nakaniwa .................. 123/674
5,638,800 A * 6/1997 Furuya et al. .............. 123/674
6,178,943 B1 * 1/2001 Taga et al. .................. 123/295
6,244,241 B1 * 6/2001 Mamiya et al. ............ 123/295
6,412,469 B1 * 7/2002 Itoyama et al. ............. 123/299
6,907,861 B2 6/2005 Asano
6,985,807 B2 * 1/2006 Asano et al. ............... 701/104
6,988,030 B2 * 1/2006 Asano et al. ............... 701/103
6,990,950 B2 * 1/2006 Asano et al. ............... 123/299
7,363,912 B2 * 4/2008 Asano et al. ............... 123/436

(Continued)

FOREIGN PATENT DOCUMENTS

EP 1 350 941 10/2003

(Continued)

OTHER PUBLICATIONS

Japanese Office Action dated Jun. 23, 2009, issued in corresponding Japanese Application No. 2007-226460, with English translation.

*Primary Examiner*—Thomas N Moulis
(74) *Attorney, Agent, or Firm*—Nixon & Vanderhye P.C.

(57) ABSTRACT

A fuel injection system designed to learn the quantity of fuel sprayed actually from a fuel injector into an internal combustion engine. When the engine is placed in a given learning condition, the system works to spray different quantities of the fuel for different injection durations in sequence to the engine through the fuel injector to collect a plurality of data on the quantity of the fuel sprayed actually from the fuel injector. The system analyzes the corrected data to determine an injection characteristic of the fuel injector, which may have changed from a designer-defined basic injection characteristic of the fuel injector, and uses the injection characteristic in calculating an injection duration or on-duration for which the fuel injector is to be opened to spray a target quantity of fuel.

7 Claims, 10 Drawing Sheets

U.S. PATENT DOCUMENTS 7,596,992 B2 * 10/2009 Asano et al. ............ 73/114.48
7,599,784 B2 * 10/2009 Ishizuka et al. ............ 701/104
7,647,160 B2 * 1/2010 Sugiyama et al. ........... 701/103
7,650,226 B2 * 1/2010 Ishizuka et al. ............ 701/114
2003/0164166 A1 * 9/2003 Takeuchi et al. ............ 123/674
2004/0267433 A1 * 12/2004 Asano et al. ............... 701/104
2009/0063020 A1 * 3/2009 Ishizuka et al. ............ 701/104

FOREIGN PATENT DOCUMENTS

JP 2004-108354 4/2004
JP 2005-036788 2/2005
JP 2005-155360 6/2005

* cited by examiner

FUEL INJECTION SYSTEM WITH INJECTION CHARACTERISTIC LEARNING FUNCTION

CROSS REFERENCE TO RELATED DOCUMENT

The present application claims the benefit of Japanese Patent Application No. 2007-226460 filed on Aug. 31, 2007, the disclosure of which is incorporated herein by reference.

BACKGROUND OF THE INVENTION

1. Technical Field of the Invention

The present invention relates generally to a fuel injection system which may be employed with automotive internal combustion engines to sample a deviation of the quantity of fuel actually sprayed by a fuel injector from a target quantity to learn an injection characteristic of the fuel injector.

2. Background Art

There are known fuel injection systems for diesel engines which are designed to spray a small quantity of fuel into the engine (usually called a pilot injection) prior to a main injection of fuel in order to reduce combustion noise or NOx emissions. In order to emphasize the beneficial effects of the pilot injection, it is essential to improve the accuracy in controlling the quantity of fuel to be sprayed from the fuel injector. The fuel injection systems are, therefore, designed to sample a deviation of the quantity of fuel actually sprayed by the fuel injector (which will also be referred to as an actual injection quantity below) from a target quantity to correct a command injection duration (also called an injection period) for which the fuel injector is to be opened so as to minimize the deviation.

For example, Japanese Patent First Publication No. 2005-155360 proposes a fuel injection system for diesel engines which is engineered to perform an injection quantity learning operation to spray a single jet of fuel into one of cylinders of the engine when the engine is placed in a non-fuel injection condition wherein a drive pulse signal indicating that a target quantity of fuel to be sprayed from the fuel injector is smaller than zero (0) is outputted to the fuel injector, for example, when the engine is undergoing a fuel cut while the gear of the engine is being changed or the engine is decelerating and to sample a resulting change in speed of the engine to calculate the actual injection quantity. If the actual injection quantity is deviated from the target quantity, the fuel injection system corrects the injection duration (i.e., an on-duration) for which the fuel is to be opened so as to minimize a deviation.

The above fuel injection system is capable of using the actual injection quantity learned by a single jet of fuel sprayed from the fuel injector to correct a corresponding injection duration accurately. In other words, the accuracy is ensured in correcting the injection duration corresponding exactly to or around the quantity of the fuel sprayed in the injection quantity learning operation.

The fuel injection system is, however, lacking in the accuracy of correcting the injection duration to spray the quantity of fuel which is different from that sprayed in the injection quantity learning operation. Typical fuel injectors each have a correlation between the injection duration and the actual injection quantity. A mathematical line representing such a correlation has some inclination which is usually different between the fuel injectors and subjected to a change with the aging of the fuel injector. In such a case, the accuracy may be lacking in correcting the injection duration using the actual injection quantity, as calculated by spraying a single jet of fuel from the fuel injector. Additionally, when it is required to correct the injection duration which is different from that for which the fuel has been sprayed in the injection quantity learning operation, it may be lacking in accuracy.

When different quantities of fuel are sprayed in sequence to learn all actual injection quantities corresponding to a required number of injection durations, it will consume much time undesirably.

SUMMARY OF THE INVENTION

It is therefore a principal object of the invention to avoid the disadvantages of the prior art.

It is another object of the invention to provide a fuel injection system for internal combustion engines which is designed to learn an injection characteristic of a fuel injector in a small amount of time which ensures the accuracy in determining an injection duration required to spray a desired amount of fuel into the engine.

According to one aspect of the invention, there is provided a fuel injection system for an internal combustion engine which may be employed as an automotive common rail fuel injection system. The fuel injection system comprises: (a) a fuel injector working to spray fuel into an internal combustion engine; and (b) an injection controller working to execute an injection instruction function when a given learning condition is encountered. The injection instruction function is to instruct the fuel injector to perform learning injection events in sequence to inject fuel into the internal combustion engine for injection durations different from each other. The injection controller also executes an actual injection quantity determining function and a correction functions, The actual injection quantity determining function works to monitor a change in operating condition of the internal combustion engine which arises from injection of fuel into the internal combustion engine to learn an actual injection quantity that is a quantity of the fuel expected to have been sprayed from the fuel injector in each of the learning injection events. The correction function works to determine an injection characteristic of the fuel injector based on the actual injection quantities, as determined by the actual injection quantity determining function. The correction function also works to determine a correction value based on the injection characteristic of the fuel injector which is required to correct an injection duration for which the fuel injector is to be opened to spray a target quantity of the fuel so as to bring a quantity of the fuel actually sprayed from the fuel injector close to the target quantity.

Specifically, the injection controller works to spray the fuel several times for different injection durations. In other words, the injection controller works to spray different quantities of the fuel in sequence into the engine through the fuel injector to collect a plurality of data on the quantity of the fuel sprayed actually from the fuel injector. This permits the injection characteristic of the fuel injector which may have changed from a designer-defined basic injection characteristic of the fuel injector to be determined in a decreased amount of time. The injection controller works to use the injection characteristic to determine an injection duration or on-duration for which the fuel injector is to be opened in a regular fuel injection control mode.

In the preferred mode of the invention, the injection instruction function determines one of the injection duration for use in a second one of the learning injection events so as to decrease a deviation of the actual injection quantity in a first one of the learning injection event from a target quantity that is a quantity of the fuel the fuel injector has been instructed to spray the fuel in the first one of the learning injection event.

The injection instruction function may determine ones of the injection durations for use in the second and subsequent ones of the learning injection events to be shorter and longer alternately than one of the injection durations used in the first one of the learning injection events.

The injection instruction function may alternatively determine ones of the injection durations for use in the second and subsequent ones of the learning injection events so as to bring the actual injection quantities in the second and subsequent ones of the learning injection events to be smaller and greater alternately than the actual injection quantity in the first one of the learning injection events.

The injection instruction function may also alternatively determine the injection durations for use in the learning injection events randomly.

The correction function works to determine analyzes the actual injection quantities to derive, as the injection characteristic of the fuel injector, a relation between an injection duration for which the fuel injector is to spray the fuel and a corresponding quantity of the fuel expected to be sprayed actually from the fuel injector. The correction function also works to search a basic injection duration from a predefined basic injection characteristic of the fuel injector which corresponds to a target quantity of the fuel to be sprayed from the fuel injector and correct the basic injection duration using the correction value.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 5(*b*) illustrates a change in speed of an internal combustion engine which arises from the spraying of fuel in the injection quantity learning mode, as illustrated in FIG. 5(*a*);

FIG. 5(*c*) illustrates a change in cylinder speed between adjacent two of revolution cycles of each cylinder of the engine which arises from the spraying of fuel in the injection quantity learning mode, as illustrated in FIG. 5(*a*);

FIG. 10(*b*) is a graph which shows a basic injection characteristic of a fuel injector and the quantities of fuel actually sprayed from the fuel injector in a first and a second event of an injection quantity learning operation;

FIG. 10(*c*) is a graph which shows an actual injection characteristic, as derived by spraying the fuel into an engine several times;

DESCRIPTION OF THE PREFERRED EMBODIMENT

Figure 1:
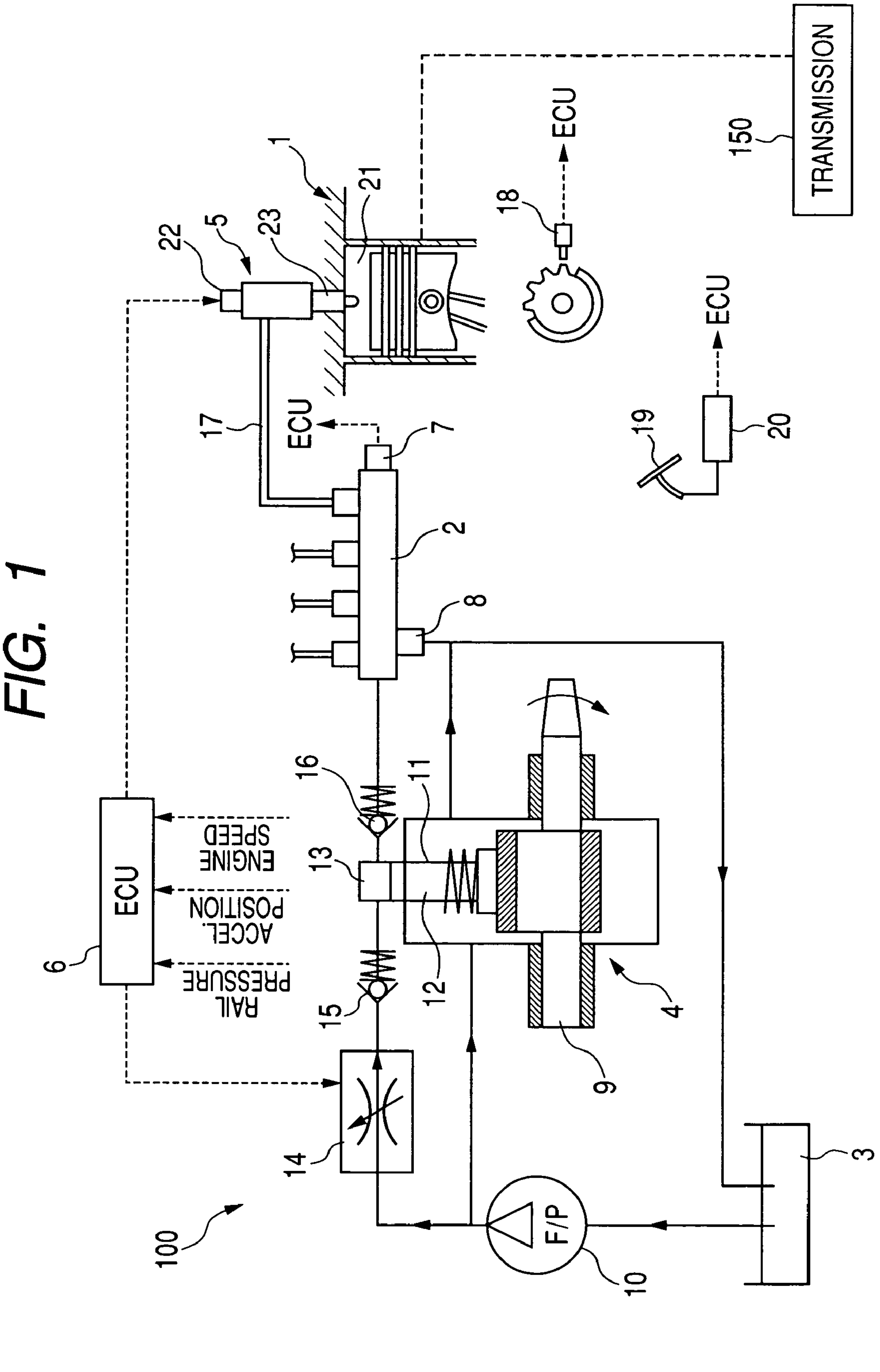
FIG. 1 is a block diagram which illustrates a fuel injection system according to the invention.

Referring to the drawings, particularly to FIG. 1, there is shown an accumulator fuel injection system 100 according to the invention which is designed as a common rail injection system for automotive internal combustion diesel engines.

The fuel injection system 100, as referred to herein, is designed to supply fuel to, for example, an automotive four-cylinder diesel engine 1 and essentially includes a common rail 2, a fuel supply pump 4, fuel injectors 5 (only one is shown for the brevity of illustration), and an electronic control unit (ECU) 6. The common rail 2 works as an accumulator which stores therein the fuel at a controlled high pressure. The fuel supply pump 4 works to pump the fuel out of a fuel tank 3 and pressurize and deliver it the common rail 2. The fuel injectors 5 are installed one in each of cylinders of the diesel engine 1 and work to spray the fuel, as supplied from the common rail 2, into combustion chambers 21 (only one is shown for the brevity of illustration) of the diesel engine 1. The ECU 6 works to control a whole operation of the fee injection system 100 and energize the fuel injectors 5 to spray the fuel into the diesel engine 1.

The ECU 6 determines a target pressure of the fuel in the common rail 2 and controls an operation of the fuel supply pump 4 to bring the pressure in the common rail 2 into agreement with the target pressure. The common rail 2 has installed therein a is pressure sensor 7 which measures the pressure of fuel in the common rail 2 (which will also be referred to as a rail pressure below) to provide a signal indicative thereof to the ECU 6 and a pressure limiter 8 working to keep the pressure in the common rail 2 below a given upper limit.

The fuel supply pump 4 includes a camshaft 9 driven by output of the diesel engine 1, a feed pump 10, a plunger 12, and a solenoid-operated suction control valve 14. The feed pump 10 is driven by the camshaft 9 to suck the fuel out of the fuel tank 3. The plunger 12 is reciprocable synchronously with rotation of the camshaft 9 within a cylinder 11 to pressurize the fuel sucked into a pressure chamber 13 defined within the cylinder 11 and discharge it. The solenoid-operated suction control valve 14 works to control the quantity of fuel to be sucked into the pressure chamber 13 through the feed pump 10.

Specifically, when the plunger 12 moves from the top dead center to the bottom dead center within the cylinder 11, the solenoid-operated suction control valve 14 works to control the flow rate of fuel delivered from the feed pump 10 into the fuel supply pump 4. The fuel then pushes an inlet valve 15 and enters the pressure chamber 13. Afterwards, when moving from the bottom dead center to the top dead center within the cylinder 11, the plunger 12 pressurizes the fuel within the pressure chamber 13 and discharge it to the common rail 2 through an outlet valve 16.

The fuel injectors 5 are installed one in each of the cylinders of the diesel engine 1 and connected to the common rail 2 through high-pressure pipes 17. Each of the fuel injectors 5 is equipped with a solenoid valve 22 and a nozzle 23. The solenoid valve 22 is energized by a control signal outputted from the ECU 6 to spray the fuel through the nozzle 23.

The solenoid valve 22 works to open or close a low-pressure fuel path extending from a pressure chamber (not shown) which is defined therein and into which the high-pressure fuel, as supplied from the common rail 2, flows to a low-pressure side. Specifically, when the solenoid valve 22 is energized, it opens the low-pressure fuel path, while when the solenoid valve 22 is deenergized, it closes the low-pressure fuel path.

The nozzle 23 has installed therein a needle (not shown) which is movable to open or close a spray hole formed in the head of the fuel injector 5. Usually, the needle is urged by the pressure of fuel in the pressure chamber of the solenoid valve 22 in a valve-closing direction to close the spray hole. When the solenoid valve 22 is energized to open the low-pressure fuel path, so that the pressure of fuel in the pressure chamber drops, it will cause the needle to be lifted up within the nozzle 23 to open the spray hole, thereby spraying the high-pressure fuel supplied from the common rail 2. Alternatively, when the solenoid valve 22 is deenergized, it will cause the low-pressure fuel path to be closed, so that the pressure of fuel in the pressure chamber rises, thereby lifting the needle down within the nozzle 23 to terminate the spraying of the fuel.

The ECU 6 connects with a speed sensor 18, an accelerator position sensor 20, and a pressure sensor 7. The speed sensor 18 works to measure the speed of the diesel engine 1. The accelerator position sensor 20 work to measure a driver's effort on or position of an accelerator pedal 19 (which corresponds to an open position of a throttle valve representing a load on the diesel engine 1). The pressure sensor 7 works to measure the pressure of fuel in the common rail 2. The ECU 6 analyzes outputs from the sensors 18, 20, and 7 to calculate a target pressure in the common rail 2 and an injection duration and an injection timing suitable for an operating condition of the diesel engine 1. The ECU 6 controls the solenoid-operated suction control valve 14 of the fuel supply pump 4 to bring the pressure in the common rail 2 into agreement with the target pressure and also controls the solenoid valve 22 of each of the fuel injectors 5 to spray the fuel at the injection timing for the injection duration.

The ECU 6 is also designed to perform the pilot injection, as described above, prior to the main injection in a regular fuel injection control mode. The accuracy of the pilot injection in each of the fuel injectors 5 usually varies depending upon a deviation of a pulse width of a drive pulse signal to be outputted from the ECU 6 to each of the fuel injectors 5 (i.e., an on-duration or an injection duration for which each of the fuel injectors 5 is kept opened, in other words, a target quantity of fuel to be sprayed from each of the fuel injectors 5) from the quantity of fuel actually sprayed from the fuel injector 5 (will also be referred to as an actual injection quantity or injection quantity Q below). In order to compensate for such an injection quantity deviation, the ECU 6 enters an injection quantity learning mode to spray the quantity of fuel identical with that in the pilot injection to learn the actual injection quantity to determine the target-to-actual injection quantity deviation and calculates a correction value required to correct the drive pulse signal (i.e., the on-duration) to be outputted to a corresponding one of the fuel injectors 5 so as to bring the actual injection quantity Q into agreement with the target quantity (i.e., a pilot injection quantity). In the regular fuel injection mode, the ECU 50 produces the corrected drive pulse signal to control the injection duration of a corresponding one of the fuel injectors 5 to bring the actual injection quantity Q into agreement with the target quantity in the pilot injection mode.

Figure 2:
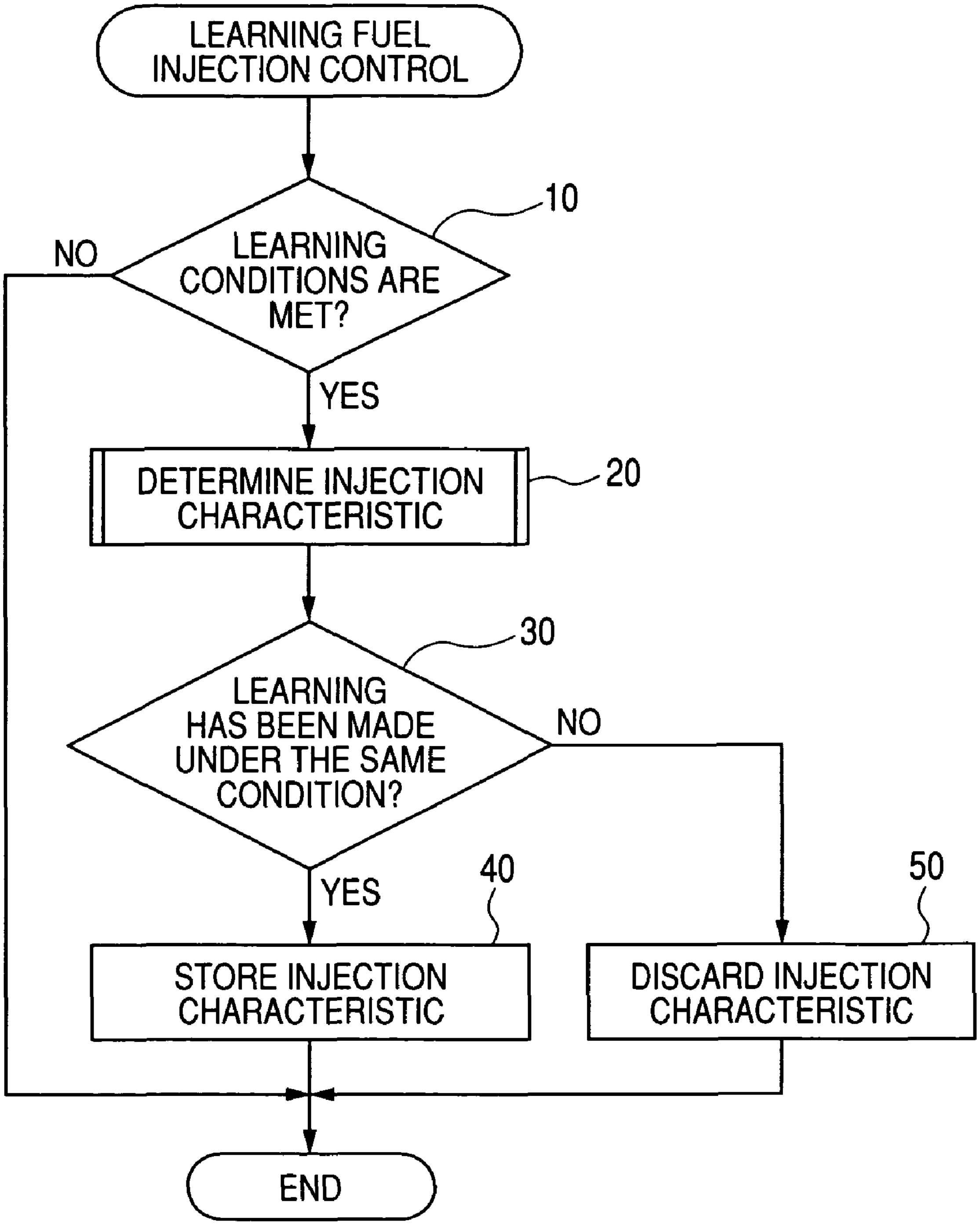
FIGS. 2, 3, and 4 illustrate a flowchart of a learning fuel injection control program to be executed by an electronic control unit of the fuel injection system of FIG. 1 to learn an actual injection characteristic of each fuel injector.

FIG. 2 is a sequence of logical steps or a learning fuel injection control program to be executed by the ECU 6.

After entering the program, the routine proceeds to step 10 wherein it is determined whether learning conditions are met or not. The learning conditions are determined to be met (a) when the drive pulse signal indicating that a target quantity of fuel to be sprayed from each of the fuel injectors 5 is smaller than zero (0) is being outputted to the fuel injector 5, (b) when a transmission 150 mounted in an automotive vehicle (which will also be referred to as a system vehicle below) equipped with the fuel injection system 100 is in a neutral position, for example, when a gear of the transmission 150 is being changed, and (c) when the pressure in the common rail 2 is kept at a given level.

In the case where the system vehicle is equipped with an EGR device, a diesel throttle, and a variable turbocharger, an open position of an EGR valve, the diesel throttle, and/or the variable turbocharger may be also added as one of the learning conditions. The transmission 150 may be determined as being in the neutral position when an output of a position sensor (not shown) which indicates that a shift lever of the transmission 150 is in the neutral position or a clutch is in a disengaged position meaning that the diesel engine 1 is physically separate from driven wheels of the system vehicle. In the latter case, the shift lever is not absolutely necessary to be in the neutral position.

If a NO answer is obtained meaning that the learning conditions are not encountered, the routine terminates. Alternatively, if a YES answer is obtained, then the routine proceeds to step 20 wherein an injection characteristic sampling task is executed to determine an injection characteristic of one of the fuel injectors 5 which is selected in this program cycle. The injection characteristic is, as will be described later in detail, defined by a relation between an on-duration or injection duration TQ for which the selected one of the fuel injectors 5 has been kept opened and a resulting quantity of fuel (i.e., the actual injection quantity Q) expected to have been sprayed actually from the selected one of the fuel injectors 5.

After step 20, the routine proceeds to step 30 wherein it is determined whether the learning conditions have been kept as they are until completion of the injection characteristic sampling task, as executed in step 20, or not. If the gear of the transmission 150 has been shifted from the neutral position, the fuel injectors 5 have been resumed to spray the fuel into the diesel engine 1, or the pressure in the common rail 2 has changed during the execution of the operation in step 20, it may result in an error in determining the injection characteristic of the fuel injector 5. Accordingly, it is determined in step 30 whether the injection characteristic sampling task has been executed under constant conditions or not.

If a YES answer is obtained meaning that the injection characteristic sampling task has been completed under the constant conditions, then the routine proceeds to step 40 wherein the injection characteristic, as derived in step 20, is stored in the ECU 6. Alternatively, if a NO answer is obtained, then the routine proceeds to step 50 Wherein the injection characteristic, as derived in step 20, is discarded. After step 40 or 50, the routine terminates.

Figure 3:
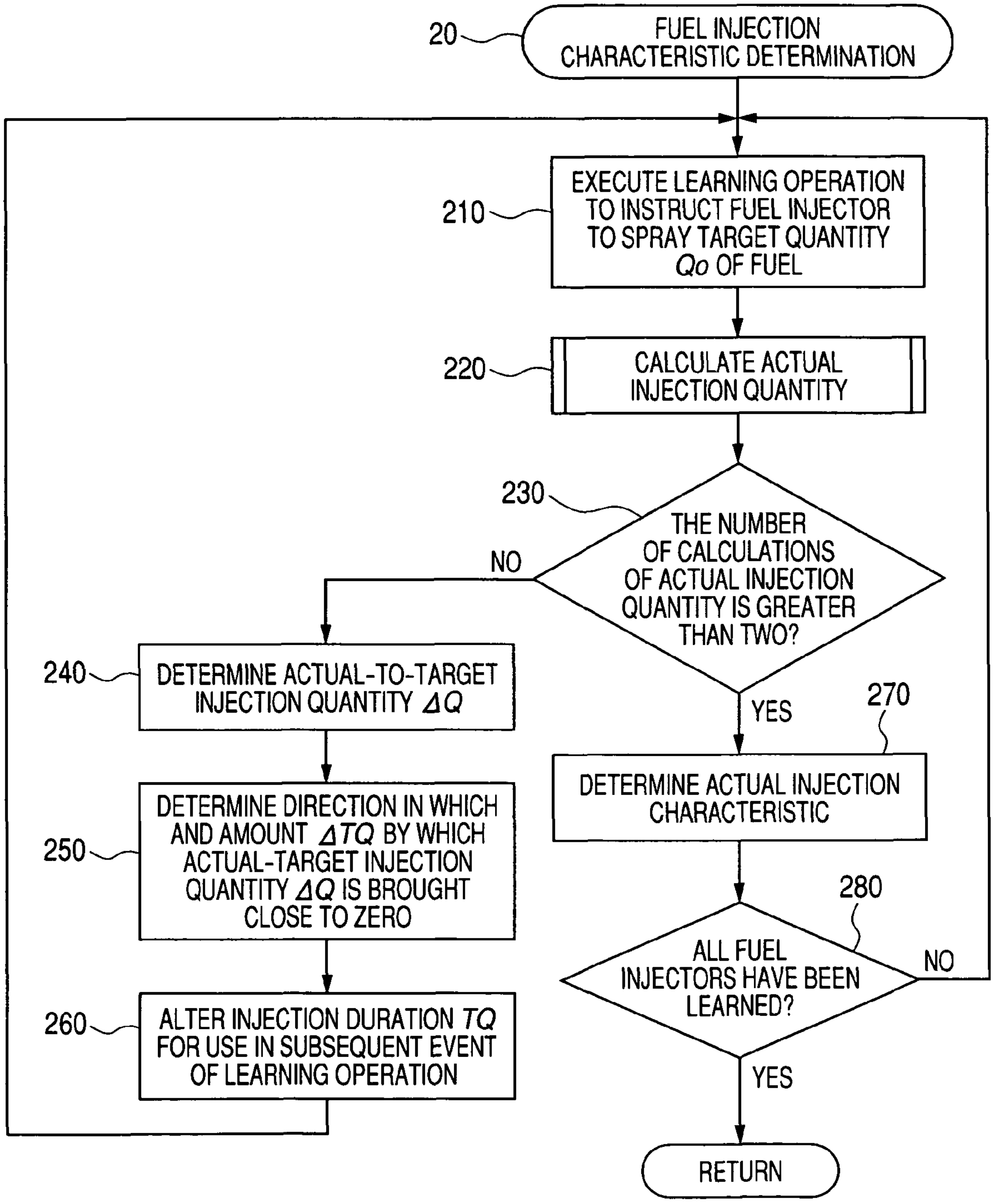

FIG. 3 shows the injection characteristic sampling task to be executed in step 20 of FIG. 2.

After entering step 20 in FIG. 2, the routine proceeds to step 210 wherein the ECU 6 initiates an injection quantity learning operation to perform a first learning fuel injection. Specifically, the ECU 6 outputs the drive pulse signal to instruct a selected one of the fuel injectors 5 to be opened for a designer-predetermined basic injection duration TQo to spray a target quantity Qo of fuel into the diesel engine 1. The target quantity Qo is identical with, for example, that usually used in the pilot injection event or any of multiple injection events other than a main injection event.

Figure 10A:
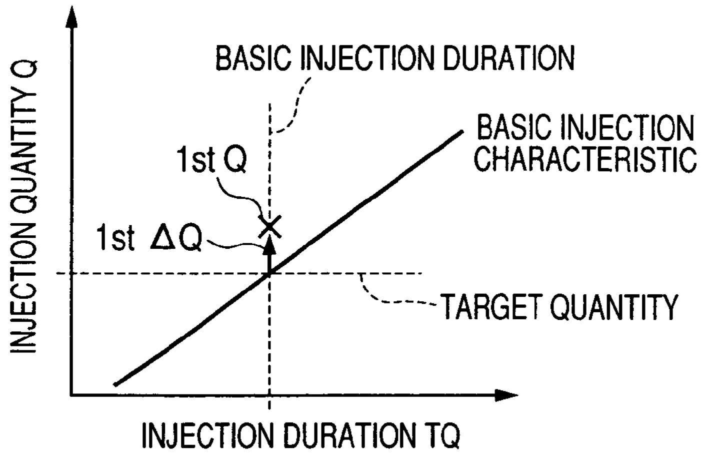
FIG. 10(*a*) is a graph which shows a basic injection characteristic of a fuel injector and the quantity of fuel actually sprayed from the fuel injector in a first event of an injection quantity learning operation.
Figure 10B:
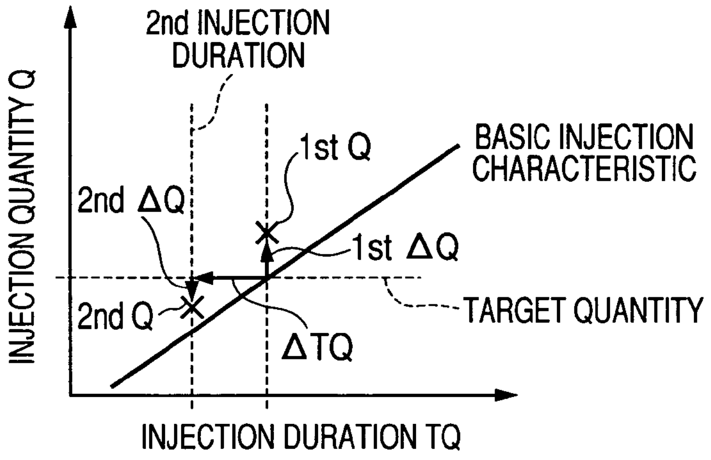
Figure 10C:
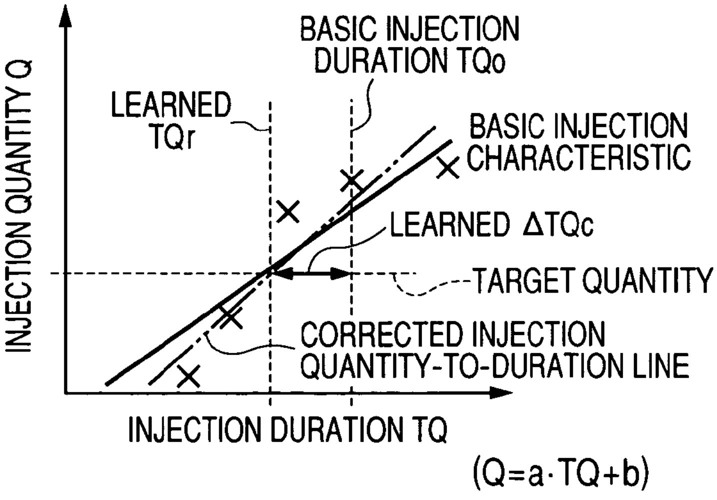

The ECU 6 stores therein a basic injection characteristic, as illustrated in FIG. 10(*a*), which represents a relation between the quantity of fuel to be sprayed from each of the fuel injectors 5 and a corresponding injection duration TQ (i.e., the on-duration) for which the solenoid valve 22 of the fuel injector 5 is to be kept energized or opened to spray such a quantity of fuel. In the regular fuel injection control mode, the ECU 6 samples the speed of the diesel engine 1 and the position of the throttle valve (i.e., the position of the accelerator pedal 19) to determine the target quantity Qo of fuel to be sprayed into the diesel engine 1, searches the injection duration TQ from the basic injection characteristic which is required to keep the solenoid valve 22 opened to spray the target quantity Qo of fuel, and outputs the drive pulse signal (i.e., a pulse current) whose pulse width corresponds to the injection duration TQ to the fuel injector 5.

The basic injection characteristic in FIG. 10(*a*) is designer-calculated for the fuel injectors 5 before used and usually varies with use of the fuel injectors 5. After entering the injection quantity learning mode in step 20; the ECU 6 learns an actual injection characteristic (i.e., a deviation from the basic injection characteristic) of a selected one of the fuel injectors 5. After such learning is completed, the ECU 6 executes the program of FIG. 2 again to learn the actual injection characteristic of a next one of the fuel Ejectors 5. Such a learning operation is repeated until the actual injection characteristics of all the fuel injectors 5 are derived.

Figure 4:
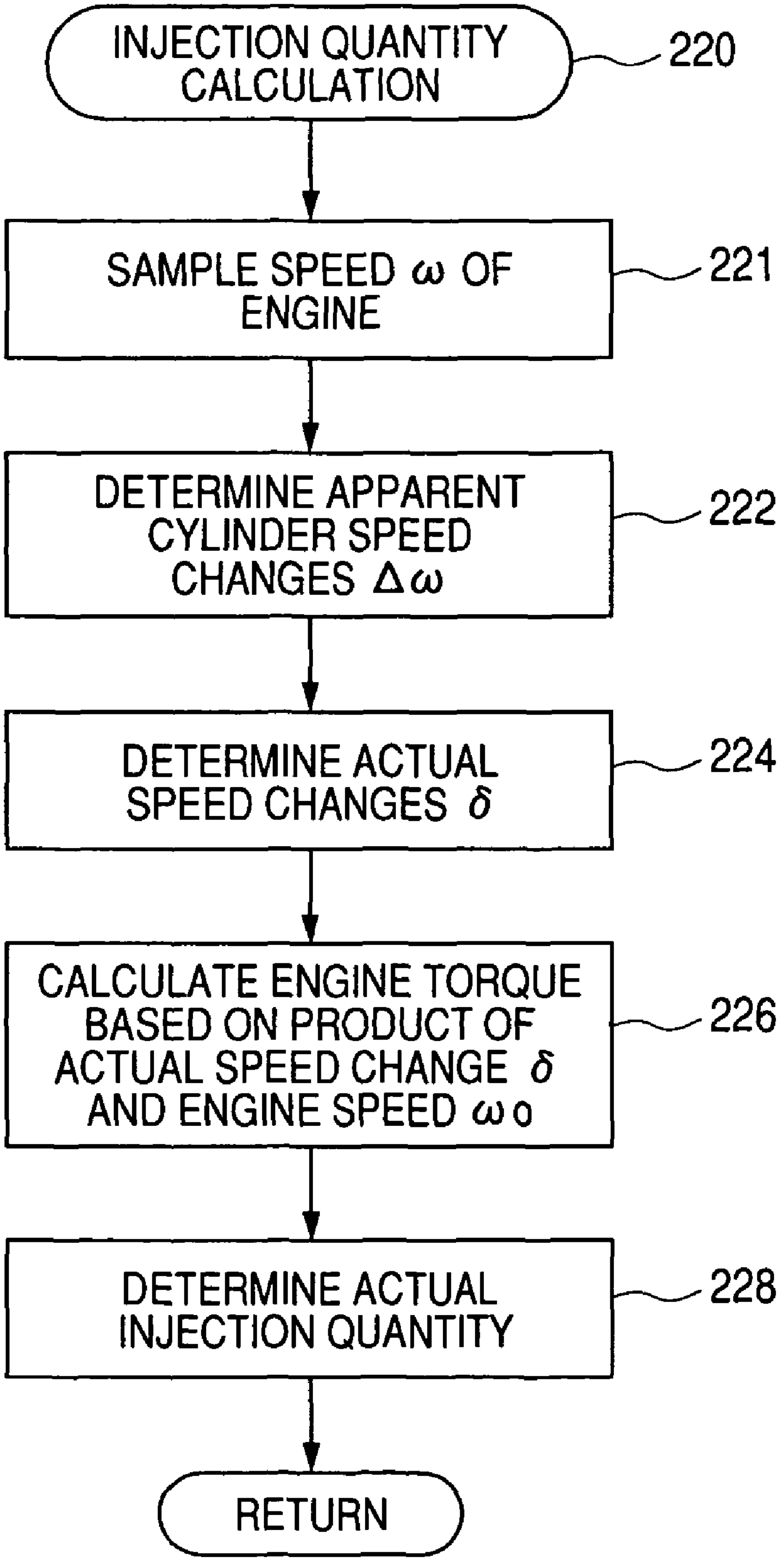

After the injector 5 is instructed to spray the target quantity Qo of fuel, as selected in this cycle of the injection quantity learning is operation, the routine proceeds to step 220 wherein the quantity of fuel expected to have been sprayed actually from the fuel injector 5 (i.e., the actual injection quantity Q) is calculated in the manner, as illustrated in FIG. 4.

Figures 5A, 5B, 5C:
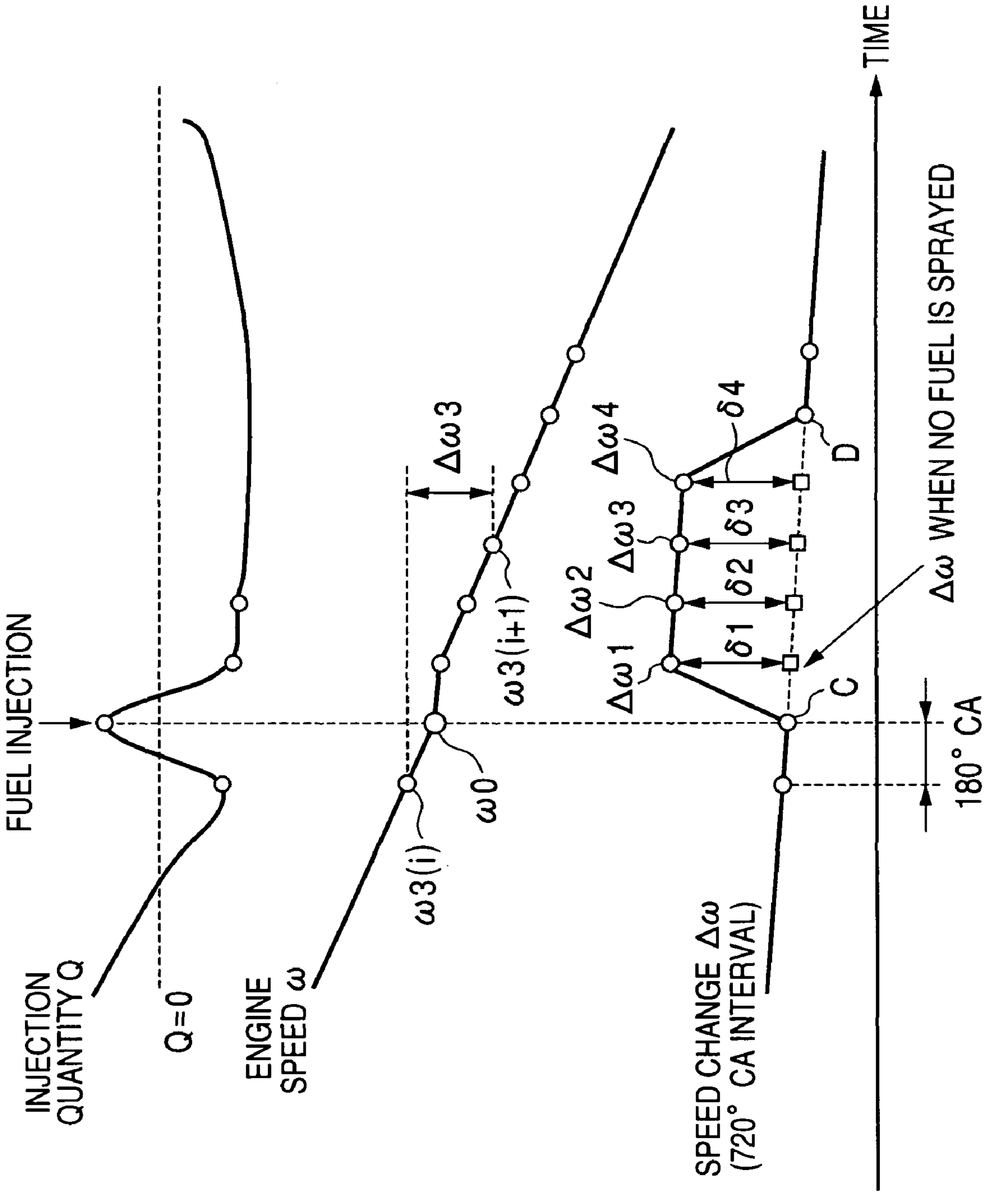
FIG. 5(*a*) illustrates the quantity of fuel sprayed from a fuel injector in an injection quantity learning mode.
Figure 6:
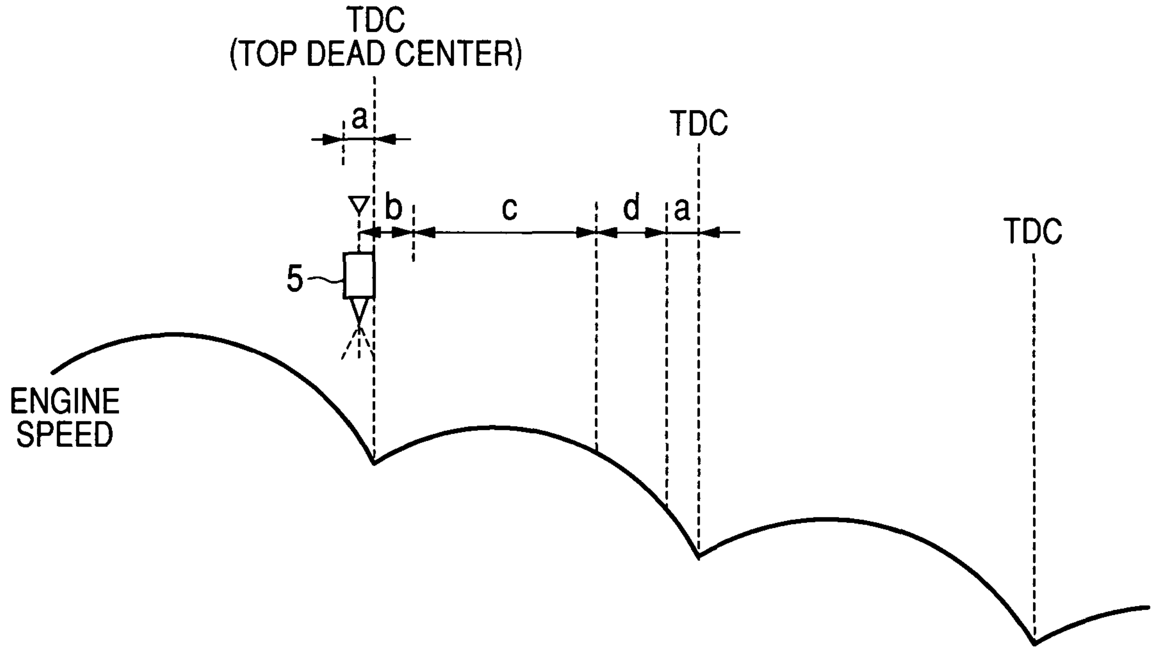
FIG. 6 is a view which shows a cycle of sampling the speed of an engine to derive a change thereof arising from spraying of fuel into the engine.

First, in step 221, an output of the speed sensor 18 indicating the speed ω of the diesel engine 1 is sampled cyclically as a parameter representing a change in operating condition of the diesel engine 1. Specifically, the ECU 6 samples the output of the speed sensor 18 in a cycle four times, one for each of the cylinders of the diesel engine 1, while the crankshaft of the diesel engine 1 revolves twice (i.e., 720° CA) and collects a time-series of engine speeds ω1(*i*), ω2(*i*), ω3(*i*), ω4(*i*), ω1(*i*+1), ω2(*i*+1), . . . (see FIG. 5(*b*)) on a cylinder basis (which will be referred to as cylinder speeds below). The sampling of the output from the speed sensor 18 is made, as illustrated in FIG. 6, within a period of time d which is set immediately before the injection timing a of the selected one of the fuel injectors 5 is reached. A period of time b is a time lag between the injection of the fuel into the diesel engine 1 and the ignition of the fuel. A period of time c is the length of time the fuel is being burned. In other words, the period of time d in which the speed ω of the diesel engine 1 is to be sampled is set the sum of the periods of time c and d after the ignition timing a of the fuel injector 5. This ensures the accuracy in sampling a change in speed ω of the diesel engine 1 which arises from the spraying of the fuel into the diesel engine 1.

The routine proceeds to step 222 wherein an apparent change Δω in speed ω is calculated with respect to each cylinder of the diesel engine 1. Taking as an example the third cylinder #3 of the diesel engine 1, an apparent change Δω3 that is, as illustrated in FIG. 5(*b*), a difference between the cylinder speeds ω3(*i*) and to ω3(*i*+1) (i.e., a difference in speed of the diesel engine 1 between adjacent two of revolution cycles of the piston of the third cylinder #3) is determined as the apparent change Δω (which will also be referred to as an apparent speed change below). The apparent speed change Δω, as can be seen in FIG. 5(*c*), decreases at a constant rate when no fuel is being injected into the diesel engine 1, but a rate of change in speed ω will be small, as illustrated in FIG. 5(*b*), immediately after the fuel is sprayed into the diesel engine 1. FIGS. 5(*a*) to 5(*b*) illustrate for the case where the fuel is sprayed into the fourth cylinder #4 of the diesel engine 1.

After the series of the apparent speed changes Δω are derived in step 222, the routine proceeds to step 224 wherein actual changes δ in speed ω of the diesel engine 1 are calculated based on the apparent speed changes Δω. Specifically, actual changes δ1, δ2, δ3, and δ4 in speed of the respective cylinders of the diesel engine 1 which have resulted from the spraying of the fuel are calculated. An average of the actual changes δ1, δ2, δ3, and δ4 is next determined as an actual speed change δx. The actual changes δ1, δ2, δ3, and δ4 are expressed by differences between the apparent speed changes Δω1, Δω2, Δω3, and Δω4, as derived in step 222, and an estimated speed change $\Delta\omega_{est}$ which is expected to occur if no fuel is sprayed into the diesel engine 1 in the injection quantity learning mode. The estimated speed change $\Delta\omega_{est}$ usually decreases at a constant rate in a non-fuel injection period and thus may be derived based on a change in speed ω before the fuel is sprayed or changes in speed ω before and after the speed ω of the diesel engine 1 is increased by the spraying of the fuel.

The routine then proceeds to step 226 wherein the product of the actual speed change δx, as derived in step 224, and a speed $\omega_0$ of the diesel engine 1, as sampled when the fuel has been sprayed, is calculated as a torque proportion p, and an output torque T of the diesel engine 1 is derived based on the torque proportion Tp. The torque proportion Tp is proportional to the output torque T of the diesel engine 1 which is produced by the spraying of the fuel in the injection quantity learning mode. The output torque T of the diesel engine 1 may be given by equation (1) below as a function of the torque proportion Tp ($=\delta x\cdot\omega_0$).

$$T=K\cdot\delta x\cdot\omega_0 \quad (1)$$

where K is a constant of proportionality.

Figure 7:
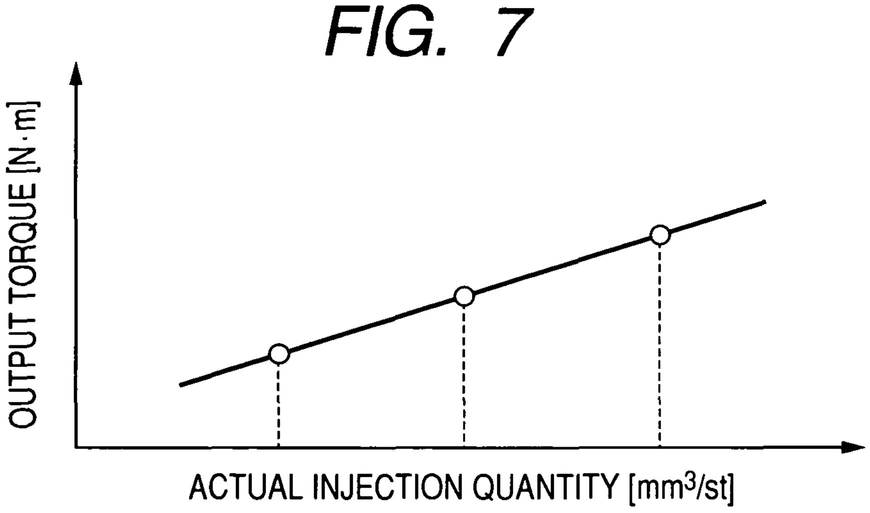
FIG. 7 is a graph which shows a relation between an output torque of an engine and the quantity of fuel sprayed into the engine.

The routine proceeds to step 228 wherein the quantity of fuel expected to have been sprayed actually from the fuel injector 5 (i.e., the actual injection quantity Q) is calculated based on the output torque T. Usually, the output torque Tp of the diesel engine 1 is, as demonstrated in FIG. 7, proportional to the actual injection quantity Q, so that the torque proportion Tp will be proportional to the actual injection quantity Q. The actual injection quantity Q may, therefore, be determined as a function of the output torque T which is calculated as a function of the torque proportion Tp. The ECU 6 stores therein an experimentally derived map listing a relation between the output torque T and the actual injection quantity Q and works to use the output toque T, as derived in step 226, to determine the actual injection quantity Q by look-up using the map.

As apparent from the above discussion, the actual injection quantity Q is derived by calculating the output torque T of the diesel engine 1 based on the average of the actual speed changes δ1, δ2, δ3, and δ4, thus ensuring the accuracy of matching the actual injection quantity Q with the output torque Tin the map stored in the ECU 6. This eliminates the need for correcting the actual injection quantity Q with the speed $\omega_0$ of the diesel engine 1 when the fuel has been sprayed thereinto.

In stead of the average δx of the actual speed changes δ1, δ2, δ3, and δ4, any one of them may be used to calculate the output torque T of the diesel engine 1.

Figure 8:
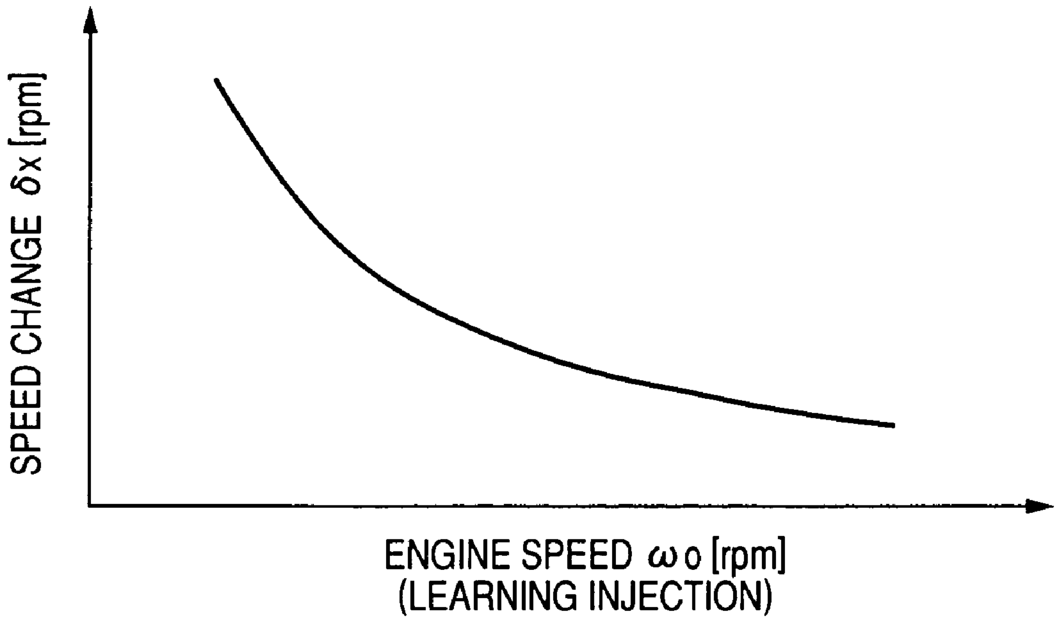
FIG. 8 is a graph which shows a relation between the speed of an engine and a change in speed of the engine when the fuel is sprayed in an injection quantity learning mode.

The actual injection quantity Q may alternatively be determined by look-up using a map, as illustrated in FIG. 8, based on the average δx of the actual speed changes δ, as derived in step 224, without calculating the output torque T in step 226. The map in FIG. 8 represents a relation between the average δx of the actual speed changes δ1, δ2, δ3, and δ4 and the speed $\omega_0$ of the diesel engine 1 when the learning injection of the fuel is made. The data on the map is experimentally derived in terms of the actual injection quantity Q. The ECU 6 stores therein the map to determine the actual injection quantity Q based on the average δx and the speed $\omega_0$ of the diesel engine 1.

Figure 9:
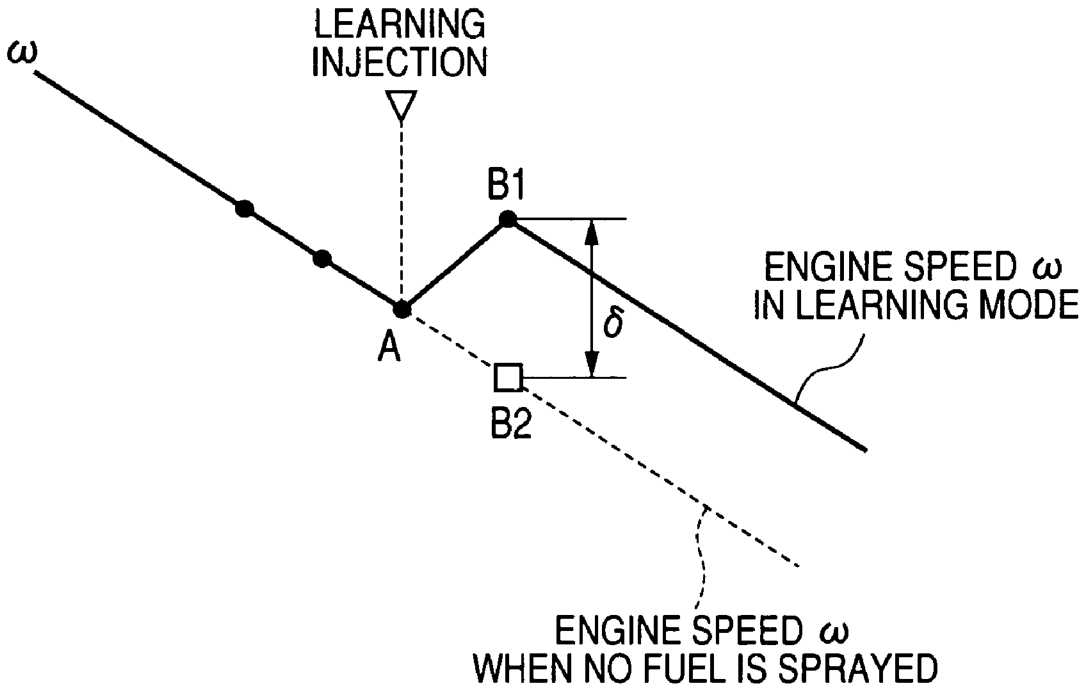
FIG. 9 is a view which shows a change in speed of an engine when the fuel is sprayed thereinto and that when no fuel is sprayed thereinto.

In step 224, the difference between the apparent speed changes Δω arising from the spraying of the fuel and the estimated speed change $\Delta\omega_{est}$ that is a change in speed ω of the diesel engine 1 expected to occur in the case where no fuel is sprayed from the fuel injector 5 is determined as the actual changes δ in speed of the cylinders of the diesel engine 1, but however, it may be expressed, as demonstrated in FIG. 9, by a difference between the value B1 of the speed ω of the diesel engine 1, as indicated by an output of the speed sensor 18, which is elevated by the spraying of the fuel ("V" in FIG. 9) and the value B2 of the speed ω expected to appear when no fuel is sprayed into the diesel engine 1 at the same time. The value B2 of the speed ω may be estimated easily using the output of the speed sensor 18, as sampled before the fuel is sprayed into the diesel engine 1, or using values of the speed changes Δω, as sampled before and after the speed ω of the diesel engine 1 is increased by the spraying of the fuel thereinto (i.e., before the time C and after the time D in FIG. 5(*c*)).

After the actual injection quantity Q is derived in step 228, the routine proceeds to step 230 in FIG. 3 wherein the number of times the actual injection quantity Q has been calculated is greater than a given value or not. The given value is set to at least two or more. The greater the given value, the better the accuracy in determining the injection characteristic of the fuel injector 5. The injection duration TQ is changed between sequential cycles of the injection quantity learning operation in step 210 to derive at least two relations of two values of the injection duration TQ and two corresponding values of the actual injection quantity Q.

If a NO answer is obtained in step 230 meaning that the actual injection quantity Q has been derived only one time, then the routine proceeds to step 240 wherein an actual-to-target injection quantity difference ΔQ between the actual injection quantity Q, as derived in step 220, and the target quantity Qo is calculated.

The routine proceeds to step 250 wherein the direction in which and the amount by which a target on-duration, that is, the injection duration TQ for which the fuel injector 5 is to be opened to spray the target quantity Qo of fuel is changed so as to bring the actual-to-target injection quantity difference ΔQ close to zero (0) are determined. Specifically, the direction in which and amount ΔTQ by which the injection duration TQ is required to be increased or decreased to bring the actual-to-target injection quantity difference ΔQ, as illustrated in FIG. 10(*b*), between the actual injection quantity Q, as derived in the first event of the injection quantity learning operation, and the target quantity Qo into agreement with zero (0).

The routine proceeds to step 260 wherein the injection duration TQ (i.e., the pulse width of the drive pulse signal to be outputted to the fuel injector 5) is altered by the amount ΔTQ for use in the second event of the injection quantity learning operation. The ECU 6 also starts in step 260 to a second learning fuel injection to spray the fuel for the altered injection duration TQ. Specifically, the ECU 6 executes the injection quantity learning operation again to spray the fuel through the fuel injector 5 for a period of time different from that in the previous cycle of the injection quantity learning operation to calculate the actual injection quantity Q additionally.

Figure 11A:
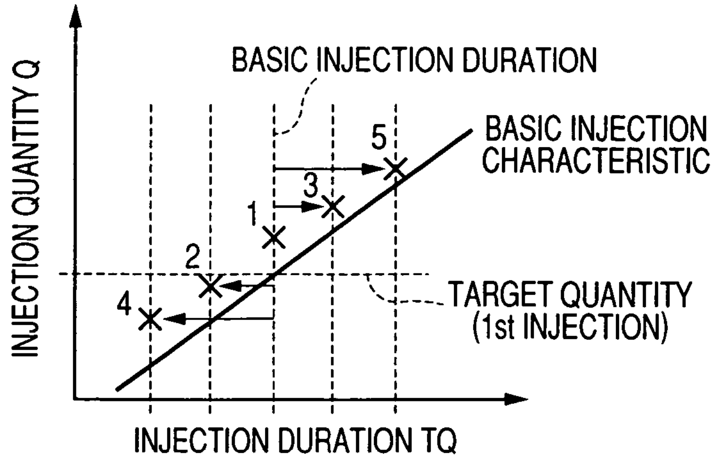
FIGS. 11(*a*), 11(*b*), and 11(*c*) demonstrate manners in which the fuel is sprayed into an engine several times to collect a plurality of data on the quantity of the fuel actually sprayed from a fuel injector.
Figure 11B:
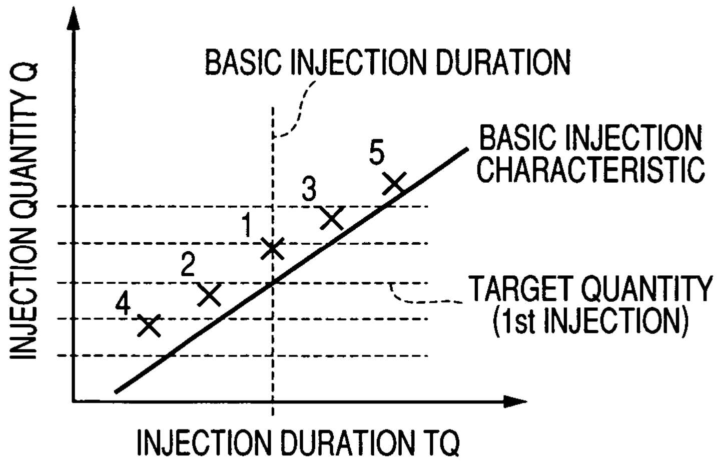
Figure 11C:
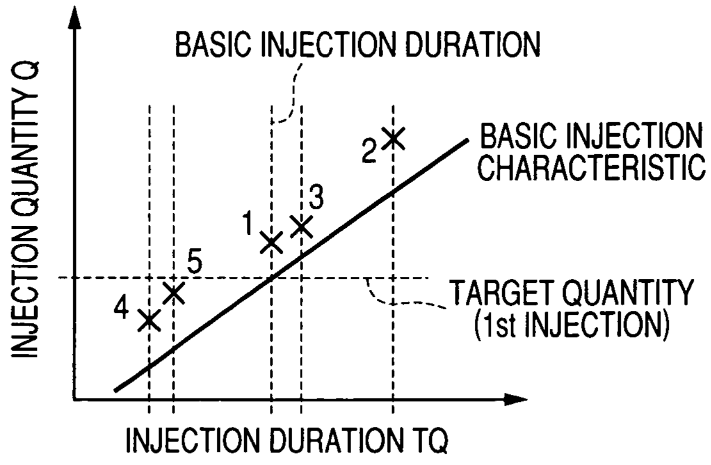

In the second event of the injection quantity learning operation in step 260, the ECU 6 instructs the fuel injector 5 to spray the fuel for the injection duration TQ which is, as demonstrated in FIG. 11(*a*), shorter than a basic injection duration TQo by the amount ΔTQ. The basic injection duration TQo is derived from the basic injection characteristic, as described above, and has been used in the first event of the injection quantity learning operation. In the third event of the injection quantity learning operation in step 260, the ECU 6 instructs the fuel injector 5 to spray the fuel for the injection duration TQ which is longer than the basic injection duration TQo by the amount ΔTQ. In the fourth event of the injection quantity learning operation in step 260, the ECU 6 instructs the fuel injector 5 to spray the fuel for the injection duration TQ which is shorter than that used in the second event of the injection quantity learning operation by the amount ΔTQ. In the fifth event of the injection quantity learning operation in step 260, the ECU 6 instructs the fuel injector 5 to spray the fuel for the injection duration TQ which is longer than that used in the third event of the injection quantity learning operation by the amount ΔTQ. Specifically, the ECU 6 changes the injection duration TQ to be longer and shorter than the basic injection duration TQo alternately to collect data on the actual injection quantity Q.

The ECU 6 may alternatively change the quantity of fuel to be sprayed from the fuel injector 5 between the cycles of the injection quantity learning operation in the following manner. In the second event of the injection quantity learning operation, the ECU 6 determines, as demonstrated in FIG. 11(*b*), the injection duration TQ required to spray the quantity of fuel smaller than the target quantity Qo by a given quantity and opens the fuel injector 5 for the determined injection duration TQ. In the third event of the injection quantity learning operation, the ECU 6 determines the injection duration 7Q required to spray the quantity of fuel greater than the target quantity Qo by the given quantity and opens the fuel injector 5 for the determined injection duration TQ. In the fourth event of the injection quantity learning operation, the ECU 6 determines the injection duration TQ required to spray the quantity a of fuel smaller than that used in the second event of the injection quantity learning operation by the given quantity and opens the fuel injector 5 for the determined injection duration TQ. In the fifth event of the injection quantity learning operation, the ECU 6 determines the injection duration TQ required to spray the quantity of fuel greater than that used in the third event of the injection quantity learning operation by the given quantity and opens the fuel injector 5 for the determined injection duration TQ. Specifically, the ECU 6 changes the quantity of fuel to be sprayed into the diesel engine 1 to be smaller and greater than the target quantity Qo alternately to collect data on the actual injection quantity Q.

The ECU 6 may alternatively be designed to, as illustrated in FIG. 11(*c*), alter the injection duration TQ randomly in the second to fifth events of the injection quantity learning operation to derive the actual injection quantities Q around the target quantity Qo the fuel injector 5 has been instructed to spray in the first event of the injection quantity learning operation. A difference between adjacent two of the injection durations TQ is not necessarily constant. It is advisable that the injection duration TQ be changed to be loner and shorter alternately than the basic injection duration TQo.

After a sequence of steps 220 to 260 is executed a plurality of times, that is, if a YES answer is obtained in step 230, the routine proceeds to step 270 wherein an actual injection characteristic of one of the fuel injectors 5 which is selected in this program execution cycle is calculated using the least-squares method. Specifically, a corrected injection quantity-to-duration line is derived as representing the actual injection characteristic using the actual injection quantities Q, as derived in the cyclic operations of step 220, according to equations (2) and (3) below.

$$a = \frac{(\Sigma TQ(i) \times Q(i) - n \times TQ_{eve} \times Q_{ave})}{\sum TQ(i)^2 - n \times TQ_{ave}} \tag{2}$$

$$b = Q_{ave} - a \times TQ_{ave} \tag{3}$$

$$TQr = \frac{Qr - b}{a} \tag{4}$$

$$\therefore \Delta TQc = TQr - TQo \tag{5}$$

where $TQ_{ave}$ is the average of the injection durations TQ, as used in step 210 and step 260, $Q_{ave}$ is the average of the actual injection quantities Q, TQr is a learned injection duration that is an actual injection duration or on-duration for which one of the fuel injectors 5, as selected in this program execution cycle, is required to be energized or opened to achieve the spraying of a target quantity of fuel, ΔTQc is a learned value that is a correction value required to correct the pulse width of the drive pulse signal to be outputted to the selected one of the fuel injectors 5 to achieve the spraying of the target quantity of fuel, Qr is a target quantity (i.e., a basic quantity in the basic injection characteristic) of fuel required to be sprayed into the diesel engine 1 which is calculated by the ECU 6 as a function of the speed of the diesel engine 1 and the position of the accelerator pedal 19 (i.e., an open position of the throttle valve), and (i) indicates the number of events of the injection quantity learning operations (i.e., one of numerals indicated in FIGS. 11(*a*) to 11(*c*)), and n is a total number of events of the injection quantity learning operations. Values ΔTQc, a, and $\Sigma Q(i)^2$ may be guarded by limit values, respectively. When one of the values ΔTQc, a, and $\Sigma Q(i)^2$ exceeds a corresponding one of the limit values, it may be fixed at the corresponding one or re-calculated by executing the injection quantity learning operation again. Such a value may also be specified as an error.

The learned injection duration TQr that is, as described above, the actual injection duration required by the fuel injector 5 to bring the quantity of fuel actually sprayed therefrom into agreement with a target value is derived according to Eq. (4) based on the target quantity Qr, an inclination a of the corrected injection quantity-to-duration line, and an intercept b of the corrected injection quantity-to-duration line. The learned value ΔTQc is determined, as can be seen in FIG. 10(*c*), by the learned injection duration TQr minus the basic injection duration TQo according to Eq. (5). The ECU 6 stores the learned values a TQc as correction values, one for each of the fuel injectors 5. In the regular fuel injection mode, the ECU 6 determines a target quantity of fuel required to be sprayed from each of the fuel injectors 5 based on the speed of the diesel engine 1 and the position of the accelerator pedal 19, searches a corresponding injection duration (i.e., the basic injection duration TQo) from the basic injection characteristic, assigns the basic injection duration TQo and the correction value & TQc derived for one of the fuel injectors 5 into Eq. (5) to derive the actual injection duration (i.e., the learned injection duration TQr), calculates the pulse width of the drive pulse signal which corresponds to the actual injection duration, and outputs the drive pulse signal to the one of the fuel injectors 5 to achieve the spraying of the target quantity of fuel at a given injection timing.

Figure 12A:
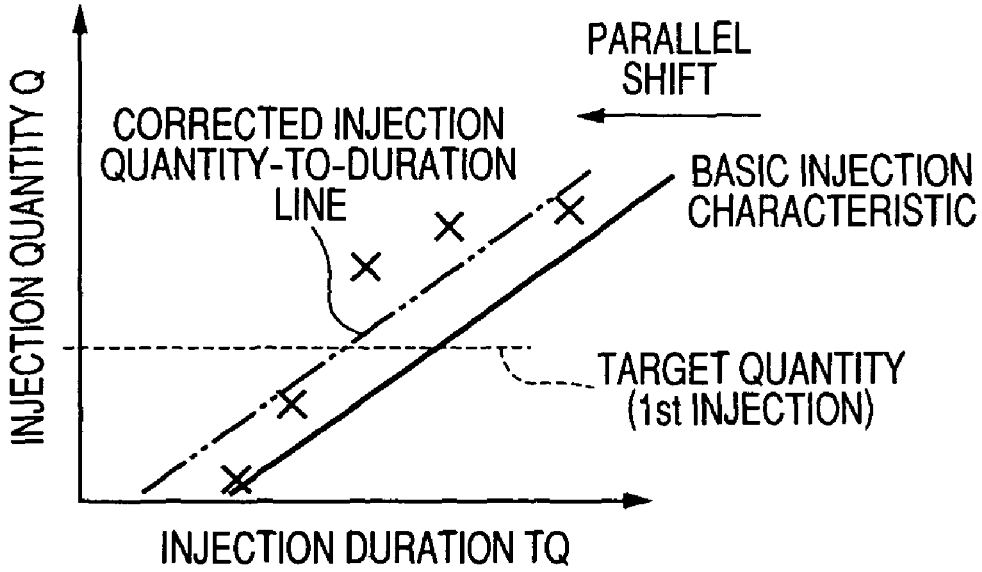
FIGS. 12(*a*) and 12(*b*) demonstrate manners in which an actual injection characteristic of a fuel injector is determined.
Figure 12B:
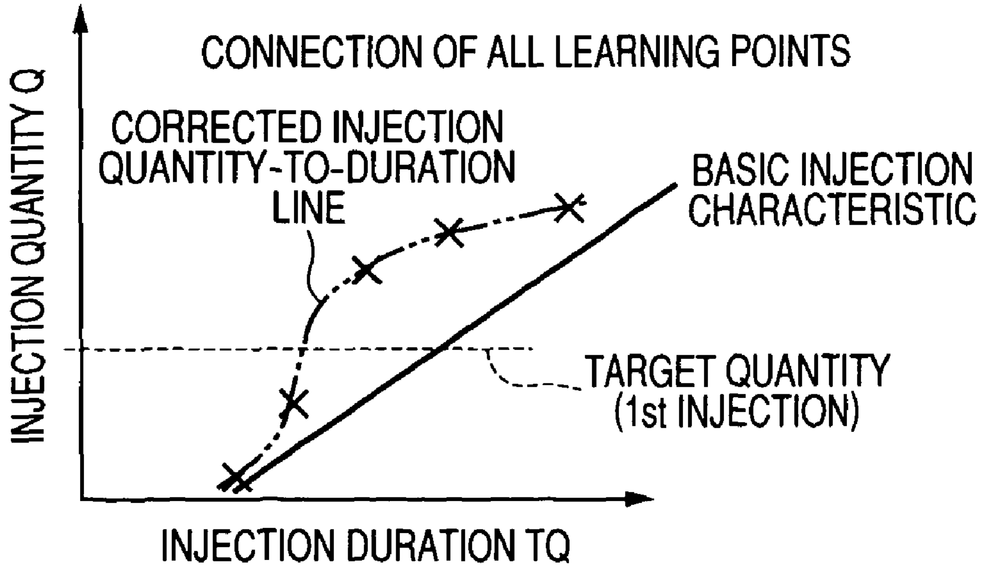

The corrected injection quantity-to-duration line may alternatively be derived, as illustrated in FIG. 12(*a*), by determining offsets or deviations of the actual injection quantities Q from the basic injection characteristic and shifting the basic injection characteristic parallel to the position, for example, where the sum of the offsets is minimized. The corrected injection quantity-to-duration line may also be derived as a curve, as illustrated in FIG. 12(*b*), defined to pass through all points representing the actual injection quantities Q.

After the corrected injection quantity-to-duration line is derived in step 270, the routine proceeds to step 280 wherein it is determined whether the corrected injection quantity-to-duration lines have been derived for all the fuel injectors 5 or not. If a NO answer is obtained, then the routine returns back to step 210 to initiate the injection quantity learning operation for a next one of the fuel injectors 5. Alternatively, if a YES answer is obtained, then the routine proceeds from step 20 to step 30 in FIG. 2 wherein it is determined whether the injection quantity learning operation for each of the fuel injectors 5 has been made under the same condition or not. In other words, it is determined whether the learning conditions, as used in step 10 to determine whether each of the fuel injectors 5 should be started to be learned or not, have remained unchanged or not during the injection quantity learning operation. If a YES answer is obtained, then the routine proceeds to step 40 wherein the corrected injection quantity-to-duration lines, as derived one for each of the fuel injectors 5, are stored in the ECU 6 for use in determining the correction value TQc. Alternatively, if a NO answer is obtained, then the routine proceeds to step 50 wherein one(s) of the corrected injection quantity-to-duration lines which has (have) been determined not to be calculated under the constant learning conditions are discarded.

As apparent from the above discussion, the fuel injection system 100 works to compensate for a change in the injection characteristic or relation between the actual injection quantity Q and the injection duration TQ of each of the fuel injectors 5 which arises from, for example, the aging thereof and ensure the accuracy in spraying a desired quantity of fuel through each of the fuel injectors 5. This also assures the stability in performing a sequence of multiple injections which are different in quantity of fuel sprayed from the fuel injectors 5.

The fuel injection system 100 works to calculate the torque output of the diesel engine 1 as produced by the spraying of fuel in the injection quantity learning operation without the adverse effect of a variation in load on the diesel engine 1 caused by, for example, an on/off operation of an air conditioner or an alternator mounted in an automotive vehicle equipped with the fuel injection system 100. Specifically, a variation in speed ω of the diesel engine 1 arising from the spraying of fuel thereinto in the injection quantity learning operation (i.e., the actual changes δ in speed ω of the diesel engine 1, as calculated in step 224) will be constant regardless of the variation in load on the diesel engine 1 as long as the speed of the diesel engine 1 is constant. A difference between a target quantity of fuel the fuel injector 5 is instructed to spray and the quantity of fuel sprayed actually from the fuel injector 5 (i.e., the actual injection quantity Q) is, therefore, determined accurately as the learned value ΔTQc by calculating the output torque T of the diesel engine 1 to determine the actual injection quantity Q without use of an additional device such as a torque sensor.

The learning conditions required to initiate the injection quantity learning operation are, as described above, selected at least to be when the fuel injectors 5 are instructed to spray no fuel and when the transmission 150 is in the neutral position, thus enabling a change in speed of the diesel engine 1 to be sampled accurately. This is because when the transmission 150 is engaged, it will cause the rotary inertia between the transmission 150 and the wheels of the automotive vehicle to be added to that of the diesel engine 1 itself and a change in road surface condition to be transmitted to the crankshaft through the power train, thus resulting in a difficulty in accurately sampling the change in speed of the diesel engine 1 arising from the spraying of fuel thereinto. The execution of the injection quantity learning operation when the transmission 150 is in the neutral position, therefore, ensures the accuracy in sampling the change in speed of the diesel engine 1, thus enabling the actual injection quantity Q to be calculated.

The ECU 6 works to perform the learning injection of the quality of fuel substantially identical with that in the pilot injection event into the diesel engine 1, but may alternatively be designed to perform the learning injection of the quantity of fuel identical with that used in the main injection event following the pilot injection event or the after-injection event following the main injection event. The ECU 6 may also be designed to perform the learning injection to learn the actual injection quantity Q in typical internal combustion engines engineered to spray a single jet of fuel during the combustion stroke of the piston of each cylinder of the engine.

The invention may also be used with fuel injection systems equipped with, for example, a distributor type fuel-injection pump with a solenoid-operated spill valve other than common rail fuel injection systems.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A fuel injection system for an internal combustion engine comprising:

a fuel injector having a configuration to spray fuel into an internal combustion engine; and an injection controller having a configuration to execute an injection instruction function when a given learning condition is encountered, the injection instruction function being to instruct said fuel injector to perform learning injection events in sequence to inject fuel into the internal combustion engine for injection durations different from each other, said injection controller also executing an actual injection quantity determining function and a correction function, the actual injection quantity determining function being to monitor a change in operating condition of the internal combustion engine which arises from injection of fuel into the internal combustion engine to learn an actual injection quantity that is a quantity of the fuel expected to have been sprayed from said fuel injector in each of the learning injection events, the correction function being to determine an injection characteristic of the fuel injector based on the actual injection quantities, as determined by said actual injection quantity determining function, the correction function also being executed to determine a correction value based on the injection characteristic of said fuel injector which is required to correct an injection duration for which said fuel injector is to be opened to spray a target quantity of the fuel so as to bring a quantity of the fuel actually sprayed from said fuel injector close to the target quantity;

wherein the injection instruction function determines the injection duration for use in a latter one of any consecutive two of the learning injection events so as to decrease a deviation of the actual injection quantity in a former one of the consecutive two of the learning injection events from a target quantity that is a quantity of the fuel said fuel injector has been instructed to spray in the former one of the consecutive two of the learning injection events, the injection instruction function also determining each of the injection durations for use in a third or subsequent one of the leaning injection events so as to change one of the injection duration and a target quantity of the fuel to be sprayed for use in a third one of any consecutive three of the learning injection events in a direction opposite a direction in which the one of the injection duration and the target quantity has been changed in a second one of the consecutive three of the learning injection events from that in a first one of the consecutive three of the leaning injection events.

2. A fuel injection system as set forth in claim 1, wherein the injection instruction function determines ones of the injection durations for use in second and subsequent ones of the learning injection events to be shorter and longer alternately than one of the injection durations used in a first one of the learning injection events.

3. A fuel injection system as set forth in claim 1, wherein the injection instruction function determines ones of the injection durations for use in second and subsequent ones of the learning injection events so as to bring the actual injection quantities in the second and subsequent ones of the learning injection events to be smaller and greater alternately than the actual injection quantity in a first one of the learning injection events.

4. A fuel injection system as set forth in claim 1, wherein the injection instruction function determines the injection durations for use in the learning injection events randomly.

5. A fuel injection system as set forth in claim 1, wherein the correction function is executed to determine analyzes the actual injection quantities to derive, as the injection characteristic of said fuel injector, a relation between an injection duration for which said fuel injector is to spray the fuel and a corresponding quantity of the fuel expected to be sprayed actually from said fuel injector, and wherein the correction function also is executed to search a basic injection duration from a predefined basic injection characteristic of said fuel injector which corresponds to a target quantity of the fuel to be sprayed from said fuel injector and correct the basic injection duration using the correction value.

6. A fuel injection system for an internal combustion engine comprising:

a fuel injector having a configuration to spray fuel into an internal combustion engine; and an injection controller having a configuration to execute an injection instruction function when a given learning condition is encountered, the injection instruction function being to instruct said fuel injector to perform learning injection events in sequence to inject fuel into the internal combustion engine for injection durations different from each other, said injection controller also executing an actual injection quantity determining function and a correction function, the actual injection quantity determining function being to monitor a change in operating condition of the internal combustion engine which arises from injection of fuel into the internal combustion engine to learn an actual injection quantity that is a quantity of the fuel expected to have been sprayed from said fuel injector in each of the learning injection events, the correction function being to determine an injection characteristic of the fuel injector based on the actual injection quantities, as determined by said actual injection quantity determining function, the correction function also having a configuration to determine a correction value based on the injection characteristic of said fuel injector which is required to correct an injection duration for which said fuel injector is to be opened to spray a target quantity of the fuel so as to bring a quantity of the fuel actually sprayed from said fuel injector close to the target quantity, wherein the injection instruction function determines the injection duration for use in a latter one of any consecutive two of the learning injection events so as to decrease a deviation of the actual injection quantity in a former one of the consecutive two of the learning injection events from a target quantity that is a quantity of the fuel said fuel injector has been instructed to spray in the former one of the consecutive two of the learning injection events.

7. A fuel injection system for an internal combustion engine comprising:

a fuel injector having a configuration to spray fuel into an internal combustion engine; and an injection controller having a configuration to execute an injection instruction function when a given learning condition is encountered, the injection instruction function being to instruct said fuel injector to perform learning injection events in sequence to inject fuel into the internal combustion engine for injection durations different from each other, said injection controller also executing an actual injection quantity determining function and a correction function, the actual injection quantity determining function being to monitor a change in operating condition of the internal combustion engine which arises from injection of fuel into the internal combustion engine to learn an actual injection quantity that is a quantity of the fuel expected to have been sprayed from said fuel injector in each of the learning injection events, the correction function being to determine an injection characteristic of the fuel injector based on the actual injection quantities, as determined by said actual injection quantity determining function, the correction function also having a configuration to determine a correction value based on the injection characteristic of said fuel injector which is required to correct an injection duration for which said fuel injector is to be opened to spray a target quantity of the fuel so as to bring a quantity of the fuel actually sprayed from said fuel injector close to the target quantity, wherein the injection instruction function determines each of the injection durations for use in a third or subsequent one of the leaning injection events so as to change one of the injection duration and a target quantity of the fuel to be sprayed for use in a third one of any consecutive three of the learning injection events in a direction opposite a direction in which the one of the injection duration and the target quantity has been changed in a second one of the consecutive three of the learning injection events from that in a first one of the consecutive three of the leaning injection events.

* * * * *